United States Patent [19]

Roberts

[11] Patent Number: 4,859,637

[45] Date of Patent: Aug. 22, 1989

[54] LEAD-FREE U.V. ABSORBING GLASS

[75] Inventor: Gordon J. Roberts, Parma, Ohio

[73] Assignee: Ferro Corporation, Cleveland, Ohio

[21] Appl. No.: 134,518

[22] Filed: Dec. 17, 1987

[51] Int. Cl.$^4$ ................................................ C03C 4/08
[52] U.S. Cl. .................................. 501/79; 501/25; 501/26; 501/58; 501/59; 501/65; 501/66; 501/67; 501/77; 501/78; 106/29
[58] Field of Search ............... 501/25, 77, 78, 905, 501/18, 58, 59, 65, 66, 67, 79, 24, 26; 106/29

[56] References Cited

U.S. PATENT DOCUMENTS

| | | | |
|---|---|---|---|
| 3,098,753 | 7/1963 | Van Dolah et al. | 501/25 UR |
| 3,146,120 | 8/1964 | Upton et al. | 501/905 X |
| 3,677,778 | 9/1969 | Ali et al. | 501/905 X |
| 3,955,991 | 5/1976 | Young et al. | 501/78 X |
| 4,353,991 | 10/1982 | Van Ness et al. | 501/77 X |
| 4,521,524 | 6/1985 | Yamashita | 501/78 X |

FOREIGN PATENT DOCUMENTS 0042250  3/1985  Japan ................................. 501/77
1083644  4/1986  Japan ................................. 501/78

OTHER PUBLICATIONS

Weyl, "Coloured Glasses", Society of Glass Technology, 1951 reprint 1967, pp. 212-213, 232-234.

Primary Examiner—William R. Dixon, Jr.
Assistant Examiner—Karl Group
Attorney, Agent, or Firm—Walter C. Danison

[57] ABSTRACT

The present invention relates to an improved U.V. absorbing glass composition comprising from about 75 to about 98 parts by weight of a lead oxide free base glass having dissolved therein from about 2 to about 25 parts by weight of a U.V. additive selected from the group consisting of cerium oxide, manganese oxide, iron oxide, cobalt oxide, copper oxide, vanadium oxide, molybdenum oxide, and mixtures of two or more of said oxides; and to an ink composition comprising from about 15 to about 25% by weight vehicle, from about 8 to about 16% by weight a ceramic pigment, and from about 59 to about 77% by weight of said U.V. absorbing glass composition.

17 Claims, No Drawings

LEAD-FREE U.V. ABSORBING GLASS

BACKGROUND OF INVENTION

The present invention relates to glass compositions, and more particularly to novel lead-free U.V. absorbing glass compositions. While the compositions of the present invention have particular utility in the compounding of inks such as silk screen inks to provide a U.V. absorbing glaze or enamel, they have utility in any application requiring a U.V. absorbing glass, including protective eyewear and the like.

There are a wide variety of applications in which a thin glaze or enamel of U.V. absorbing glass is deposited on part or all of a base glass substrate to prevent the transmission of ultraviolet light (in general the term "glaze" being understood to mean a transparent glass, while an "enamel" will be understood to mean a glass containing pigment or other particles in suspension). For example, in the fabrication of motor vehicles, particularly in the sealing of glass windshields and the like, materials are employed which tend to be very sensitive to ultraviolet light. In order to protect these sealant materials it is common practice to deposit a thin narrow strip of ultraviolet light absorbing enamel at the peripheral edges of such automotive glass to prevent transmission of potentially harmful U.V. radiation to the sealant.

While the discussion which follows will refer to "windshields" and/or "windshield glass", it will be understood that unless otherwise clear from the context, these terms will be understood to refer to any automotive glass member, i.e. windshield, rear window, side windows, etc.

At the present time, these enamels are typically compounded from a lead oxide containing glass composition, which is suspended, together with a black pigment, in a suitable vehicle to provide an ink which can be silk screened onto the edges of the automotive windshield. In this way, during final shaping of the windshield member, the enamel or glaze can be fired, fusing it with the windshield to provide a thin layer of glass, typically about 0.25 to 2 inches wide and about 1 mil in thickness.

The glass compositions presently employed in such application typically do not have sufficient U.V. absorption characteristics to be employed as a glaze, and therefore are normally used in conjunction with a black pigment to provide an enamel having substantially better U.V. absorbing characteristics than the glass alone.

In his work entitled "Coloured Glasses" (Society of Glass Technology, 1951 Reprint 1967, pages 212-213 and 232-234) Weyl discusses the use of metal oxide mixtures glass. In the course of his discussion, Weyl notes that mixtures of $TiO_2$ with $Fe_2O_3$ or $CeO_2$ can promote a shift in the iron or cerium valence, thereby shifting the light wave length absorbed by the glass. He specifically suggests that cerium oxide may impart U.V. light absorbing characteristics to lead glasses.

It will, of course, be understood that it is highly desirable to provide a glass having improved ultraviolet light absorbing characteristics. It will be equally apparent that it would be particularly advantageous to obtain such improved U.V. properties in a glass which was lead free, so as to provide greater safety by elimination of lead from both the work place in which the glass compositions are prepared and used as well as the final glass composition itself.

SUMMARY OF INVENTION

The novel U.V. absorbing glass composition of the pr invention contains from about 77% to about 98% by weight of a base glass composition having dissolved therein from about 2% to about 23% by weight of a U.V. absorbing oxide portion selected from the group consisting of cerium oxide, manganese oxide, iron oxide, cobalt oxide, copper oxide, vanadium oxide, molybdenum oxide and mixtures of two or more such oxides. In general, the composition of the base glass is not critical per se though it should have compatible expansion characteristics and fusion temperatures to suit the substrate soda-lime glass, and it should be characterized by the absence of lead oxide, while generally containing oxides of silicon, boron, sodium, potassium and zinc and optionally containing oxides of zirconium, aluminum, lithium and barium.

Where the glass is to be employed in conjunction with automotive applications, slightly different properties may be required according to the particular glass member involved. For use in conjunction with the substantially flat side windows and the curved rear window which are tempered, an enamel containing the glass of the present invention must mature and be compatible with a fast fire, to approximately 1150° to 1250° F. (glass temperature) for a relatively brief period, i.e. one to five minutes or so. On the other hand, the curved front is sagged or pressed into shape necessitating a slower fire, generally approximately 1100° to 1150° F. with a longer hold, i.e. 4 to 20 minutes. In both such applications a coefficient of expansion of $80 \times 10^{-7}/°C$. or less is desirable so as to yield some in the enamel layer. Unless otherwise clear from the context, temperatures referred to herein are glass temperatures, that is to say the temperature of the glass itself, which may be somewhat lower than oven temperature, particularly in commercial applications.

Since one of the most immediate utilities of the glass compositions of the present invention is in the area of enamels for automotive applications, a substantial portion of the discussion herein will be directed to such applications, and the specific properties desired for such applications. It will, however, be understood that this merely represents one particular end use for which the glass compositions of the present invention are particularly suited, and that the glass compositions of the present invention are not limited to automotive applications, nor to any particular set of physical properties or characteristics which such end uses might dictate.

The glasses of the foregoing type can be melted in sintered fused silica crucibles at 1200° C. with little attack on the crucible, though melting time must be controlled somewhat closely because of fluorine loss and will vary according to the size of the batch, i.e. optimum time for a 500 gm batch may be 25 to 30 minutes while the optimum time for a 1 kg batch of the same composition might be 55 to 65 minutes. The melt may be handled by any suitable means though typically it is quenched by steel rolls into flake or frit, using techniques well known to those skilled in the art.

Where the glass is to be employed in silk screen ink enamels for automotive type applications the quenched frit is generally milled in alcohol, dried, mixed with a suitable quantity of black ceramic pigment then dispersed in a suitable vehicle with other well known additives to form the screening ink which can be applied to the preshaped glass members by silk screening and then fired to provide the ultimate U.V. absorbing enamel layer.

PREFERRED EMBODIMENT the preferred glass compositions of the present invention the base glass contains (in parts by weight based on the overall weight of the entire glass composition) from about 19 to about 45 parts $SiO_2$, from about 20 to about 33 parts $B_2O_3$, from about 8 to about 15 parts alkali metal oxide, from about 0 to about 35 parts zinc oxide, from about 0 to about 10 parts zirconium dioxide, from about 0 to about 6 parts aluminum oxide, from 0 to about 3 parts barium oxide, from about 0 to about 8 parts $P_2O_5$, from about 0 to about 6 parts $La_2O_3$, and from about 2 to about 10 parts fluorine added to the 100 parts of the oxides.

The preferred U.V. absorbing additive of the present invention comprises a mixture of molybdenum oxide, iron oxide, cobalt oxide, cerium oxide and manganese oxide and the mixture is present in from about 6 to about 15 parts by weight based on the overall weight of the entire glass formulation.

A particularly preferred range of metal oxides for the glass compositions of the present invention would be $SiO_2$ 25–38%, $B_2O_3$ 22–30%, $ZrO_2$ 0–8%, $Al_2O_3$ 0–5%, $R_2O$ total ($Na_2O+K_2O+Li_2O$) 9–14%, ZnO 8–21%, BaO 0–3%, $MoO_3$ 2–4%, $Fe_2O_3$ 1–5%, CoO 1–4%, CuO 0–4%, $CeO_2$ 1–5%, $MnO_2$ 0–4%, $V_2O_5$ 0–2%, $P_2O_5$ 0–4%, $TiO_2$ 0–3%, CaO 0–4%, $La_2O_3$ 0–5%, $F_2$ 2–10%.

It will, of course, be apparent that some of the metal oxides which are employed in the U.V. absorbing component of the compositions of the present invention may tend to impart a color to the glass which may for aesthetic reasons limit the quantity of such metal oxide that can be employed, even in the preparation of black pigment containing enamels For example, manganese oxide, while very effective in absorbing U.V. light, tends to impart an overpowering reddish tinge which can be aesthetically objectionable in certain applications.

By way of illustration and not by way limitation, the following examples will describe specific glass compositions within the scope of the present invention and their preparation.

EXAMPLE I

A "base" glass composition was prepared containing 45 parts by weight $SiO_2$, 25 parts by weight $B_2O_3$, 6 parts by weight $ZrO_2$, 9 parts by weight $Na_2O$, 7.5 parts by weight ZnO, 4 parts by weight $K_2O$, 0.5 parts by weight $Li_2O$ and 6 parts by weight $F_2$. 3 parts by weight of various candidate metal oxides were then added to 97 parts by weight of base glass, and the percentage of transmission of U.V. light from a long wavelength (365 m$\mu$) U.V. source, and from a short wavelength (254 m$\mu$) U.V. source were measured The results of these test for 10 specific candidate U.V. additives are set forth in Table I.

EXAMPLE 2A

A second base glass composition, similar to that of Example 1, was prepared containing 44 parts

TABLE I

U.V. TRANSMISSION OF GLAZES FIRED on FLOAT GLASS at 1250° F./4 MINS

| Sample No. | % Transmission at 365 m$\mu$ | % Transmission at 254 m$\mu$ | Remarks | % Absorbers | Absorbers Used |
|---|---|---|---|---|---|
| 0 | 58.1 | 3.2 | Base Glass | 0 | None |
| 1 | 34.4 | 2.1 | | 3 | 3% $CeO_2$ |
| 2 | 20.4 | 1.0 | | 3 | 3% $MnO_2$ |
| 3 | 21.5 | 1.3 | | 3 | 3% $Fe_2O_3$ |
| 4 | 21.5 | 1.3 | | 3 | 3% CoO |
| 5 | 22.6 | 2.3 | | 3 | 3% CuO |
| 6 | 29.0 | 2.4 | | 3 | 3% $V_2O_5$ |
| 7 | 15.1 | 0.8 | Partially Crystallized | 3 | 3% NiO |
| 8 | | | Didn't Dissolve | 3 | 3% $Cr_2O_3$ |
| 9 | 22.6 | 1.4 | | 3 | 3% $MoO_3$ |
| 10 | 58.1 | 3.5 | | 3 | 3% $WO_3$ |

$SiO_2$, 26 parts $B_2O_3$, 6 parts $ZrO_2$, 9 parts $Na_2O$, 4 parts $K_2O$, 4 parts ZnO with 6 parts by weight of $F_2$ added. The further series of samples marked 11 through 18 were prepared by adding 7 parts by weight of U.V. additive to 93 parts by weight of base glass. In sample 11, 4 parts $CeO_2$, and 3 parts $TiO_2$ were added to the base glass; for sample 12, 4 parts $Fe_2O_3$ and 3 parts vanadium oxide were added to the base glass; for sample 13, 3 parts cerium oxide and 4 parts manganese oxide were added to the base glass; for sample 14, 4 parts manganese oxide and 3 parts copper oxide were added to the base glass; for sample 15, 3 parts cerium oxide and 4 parts copper oxide were added to the base glass; for sample 16, 6 parts manganese dioxide and 1 part copper oxide were added to the base glass; for sample 17, 3 parts copper oxide and 4 parts vanadium oxide were added to the base glass; and for sample 18, 3 parts iron oxide and 4 parts titanium oxide were added to the base glass. The foregoing samples were subjected to long and short wavelength U.V. radiation as described in Example 1 and the percent of transmission was measured and is set forth in Table II.

EXAMPLE 3

A base glass slightly different from that of Example 2 was prepared containing 44 parts $SiO_2$, 25 parts $B_2O_3$, 7 parts $ZrO_2$, 9 parts $Na_2O$, 4 parts $K_2O$, plus 6 parts by weight $F_2$ as before to which 11 parts of the additive were added. This base glass was used to prepare 3 additional samples designated 19, 20 and 21. Sample 19 contained 89 parts base glass and 4 parts cerium oxide, 6 parts manganese oxide and 1 part cobalt oxide. Sample 20 contained 89 parts base glass, 3 parts cerium oxide, 5 parts manganese oxide, 2 parts copper oxide, and 1 part cobalt oxide. Sample 21

TABLE II

U.V. TRANSMISSION OF GLAZES FIRED on FLOAT GLASS at 1250° F./4 MINS

| Sample No. | % Transmission at 365 mµ | % Transmission at 254 mµ | Remarks | % Absorbers | Absorbers Additive Used |
|---|---|---|---|---|---|
| A-1 | 53.3 | 1.6 | Commercial Lead - U.V. Glass | 0 | None |
| 11 | 18.3 | 0.7 | | 7 | 4% $CeO_2$ 3% $TiO_2$ |
| 12 | 34.4 | 1.6 | | 7 | 4% $Fe_2O_3$ 3% $V_2O_5$ |
| 13 | 23.7 | 0.7 | | 7 | 3% $CoO_2$ 4% $MnO_2$ |
| 14 | 10.8 | 0 | | 7 | 4% $MnO_2$ 3% CuO |
| 15 | 14.0 | 0.9 | | 7 | 3% $CeO_2$ 4% CuO |
| 16 | 29.0 | 0 | | 7 | 6% $MnO_2$ 1% CoO |
| 17 | 22.6 | 1.5 | | 7 | 3% CuO 4% $V_2O_5$ |
| 18 | 5.2 | 0.8 | Partially Crystallized | 7 | 3% $Fe_2O_3$ 4% $TiO_2$ |
| 19 | 21.5 | 0.9 | | 11 | 4% $CeO_2$ 6% $MnO_2$ 1% CoO |
| 20 | 24.7 | 1.9 | | 11 | 3% $CeO_2$ 5% $MnO_2$ 2% CuO 1% CoO |
| 21 | 19.4 | 1.0 | | 11 | 3% $CoO_2$ 3% $MnO_2$ 2% CuO 1% CoO 2% $TiO_2$ | contained 89 parts base glass, 3 parts cerium oxide, 3 parts manganese oxide, 2 parts copper oxide, 1% cobalt oxide and 2 parts titanium oxide. The results for the testing of samples 19 through 21 are also set forth in Table II which compares the transmission figures for samples 11 through 21 with a commercial lead glass presently employed in production of commercial U.V. absorbing enamel compositions.

EXAMPLE 4

Two further compositions containing a higher level of U.V. additive were prepared. Sample 22 contained 40 parts $SiO_2$, 25 parts $B_2O_3$, 6 parts $ZrO_2$, 8 parts $Na_2$, 4 parts $K_2O$ and 6 parts $F_2$ as before, plus 1 part Cerium oxide, 8 parts manganese oxide, 3 parts copper oxide, 1 part cobalt oxide, 2 parts iron oxide and 2 parts titanium dioxide. Sample 23 contained 38 parts $SiO_2$, 23 parts $B_2O_3$, 4 parts $ZrO_2$, 8 parts $Na_2O$, 4 parts $K_2O$ plus 6% $F_2$ as before, and also 1 part cerium oxide, 10 parts manganese oxide, 6 parts copper oxide, 2 parts cobalt oxide, 2 parts iron oxide and 2 parts titanium dioxide. These two samples were also tested for transmission of long and short wavelength U.V. light and the results for these tests comparing these two samples with another sample of commercial lead glass as set forth in Table III.

EXAMPLE 5

A series of compositions particularly suited for fast fire applications were prepared in a manner similar to that set forth in the proceeding examples The metal oxide composition of these glasses is set forth in Table IV. The U.V. transmission data at different firing temperatures for a particularly effective composition, Sample 29, is set forth in Table V. It should be noted that while Table V sets

TABLE III

U.V. TRANSMISSION OF GLAZES FIRED on FLOAT GLASS at 1250° F./4 MINS

| Sample No. | % Transmission at 365 mµ | % Transmission at 254 mµ | Remarks | % Absorbers | Absorbers Additive Used |
|---|---|---|---|---|---|
| A-2 | 62.4 | 2.2 | Commercial Lead - U.V. Glass | 0 | None |
| 22 | 1.0 | 0 | | 17 | 1% $CeO_2$ 8% $MnO_2$ 3% CuO 1% CoO 2% $Fe_2O_3$ 2% $TiO_2$ |
| 23 | 0 | 0 | | 23 | 1% $CeO_2$ 10% $MnO_2$ 6% CuO, 2% CoO 2% $Fe_2O_3$ |

TABLE III-continued

U.V. TRANSMISSION OF GLAZES FIRED on FLOAT GLASS at 1250° F./4 MINS

| Sample No. | % Transmission at 365 mµ | % Transmission at 254 mµ | Remarks | % Absorbers | Absorbers Additive Used |
|---|---|---|---|---|---|
| | | | | | 2% TiO2 |

TABLE IV

GLASS COMPOSITIONS

| BASE GLASS | SAMPLE NO. | | | | | | |
|---|---|---|---|---|---|---|---|
| | 1 | 2 | 3 | 4 | 5 | 6 | 7 |
| SiO2 | 16.64 | 16 | 16 | 16 | 16 | 16 | 18 |
| B2O3 | 26.62 | 26 | 25 | 25 | 26 | 26 | 25 |
| ZnO | 34.23 | 34 | 32 | 30 | 31 | 30 | 27 |
| Na2O | 10.03 | 9 | 9 | 9 | 9 | 9 | 6 |
| K2O | | | | | | | 3 |
| CaO | 4.38 | 4 | 3 | 3 | 4 | 4 | 3 |
| TiO2 | | | | | 3 | 4 | 4 |
| ZrO2 | 2.10 | 3 | 3 | 3 | 3 | 3 | 3 |
| F2 | 4 | 4 | 4 | 4 | 4 | 4 | 4 |
| U.V. Additive | | | | | | | |
| MoO3 | 3 | 3 | 3 | 3 | 4 | 3 | 3 |
| Fe2O3 | 3 | 3 | 3 | 5 | 1 | 1 | 2 |
| MnO2 | | 2 | 2 | 2 | 1 | | 1 |
| CuO | | | 3 | 3 | | | 1 |
| CoO | | | 1 | 1 | 3 | 2 | 2 |
| CeO2 | | | | | | 2 | 2 |

| BASE GLASS | SAMPLE NO. | | | | | | |
|---|---|---|---|---|---|---|---|
| | 8 | 9 | 10 | 11 | 12 | 13 | 14 |
| SiO2 | 20 | 22 | 26 | 30 | 32 | 34 | 36 |
| B2O3 | 24 | 23 | 22 | 20 | 20 | 20 | 20 |
| ZnO | 26 | 25 | 22 | 22 | 20 | 17 | 15 | 13 |
| Na2O | 6 | 6 | 6.71 | 6.71 | 6.71 | 6.71 | 6.71 |
| K2O | 3 | 3 | 3.29 | 3.29 | 3.29 | 3.29 | 3.29 |
| CaO | 3 | 3 | 3 | 2 | 2 | 2 | 3 |
| TiO2 | 4 | 4 | 4 | 2 | 3 | 3 | 3 |
| ZrO2 | 3 | 3 | 3 | 5 | 5 | 5 | 5 |
| F2 | 4 | 4 | 4 | 4 | 4 | 4 | 4 |
| U.V. Additive | | | | | | | |
| MoO3 | 3 | 3 | 3 | 3 | 3 | 4 | 4 |
| Fe2O3 | 2 | 2 | — | — | — | — | — |
| MnO2 | 1 | 1 | — | — | — | — | — |
| CuO | 1 | 1 | 2 | 2 | 2 | — | — |
| CoO | 2 | 2 | 3 | 3 | 3 | 4 | 4 |
| CeO2 | 2 | 2 | 3 | 3 | 3 | 3 | 3 |

| BASE GLASS | SAMPLE NO. | | | | | | |
|---|---|---|---|---|---|---|---|
| | 15 | 16 | 17 | 18 | 19 | 20 | 21 |
| SiO2 | 38 | 38 | 38 | 38 | 38 | 38 | 38 |
| B2O3 | 20 | 21 | 21 | 20 | 20 | 20 | 20 |
| ZnO | 13 | 12.5 | 12 | 10 | 13 | 10 | 8 |
| Na2O | 6.71 | 6.71 | 6.71 | 6.71 | 6.71 | 6.71 | 6.71 |
| K2O | 3.29 | 3.79 | 4.29 | 3.29 | 3.29 | 3.29 | 3.29 |
| CaO | — | 2 | 2 | 2 | 2 | 2 | 3 |
| TiO2 | 3 | — | — | — | — | — | — |
| AMP* | — | — | — | 2 | — | 2 | 4 |
| ZrO2 | 5 | 5 | 5 | 6 | 6 | 6 | 6 |
| F2 | 4 | 4 | 4 | 4 | 4 | 4 | 4 |
| U.V. Additive | | | | | | | |
| MoO3 | 4 | 3 | 3 | 4 | 4 | 4 | 4 |
| Fe2O3 | — | 1 | 1 | 1 | — | 2 | 2 |
| MnO2 | — | — | — | — | — | — | — |
| CuO | — | 1 | 1 | — | — | — | — |
| CoO | 4 | 4 | 4 | 4 | 4 | 2 | 2 |
| CeO2 | 3 | 2 | 2 | 3 | 3 | 4 | 4 |

| BASE GLASS | SAMPLE NO. | | | | |
|---|---|---|---|---|---|
| | 22 | 23 | 24 | 25 | 26 |
| SiO2 | 38 | 38 | 38 | 36 | 36 |
| B2O3 | 20 | 22 | 24 | 22 | 24 |
| ZnO | 10 | 10 | 8 | 12 | 10 |
| Na2O | 6.71 | 6.71 | 6.71 | 6.71 | 6.71 |
| K2O | 3.29 | 3.29 | 3.29 | 3.29 | 3.29 |
| CaO | 2 | — | — | — | — |
| TiO2 | — | — | — | — | — |
| AMP* | 2 | 2 | 2 | 2 | 2 |
| ZrO2 | 6 | 6 | 6 | 6 | 6 |
| F2 | 4 | 4 | 4 | 4 | 4 |
| U.V. Additive | | | | | |
| MoO3 | 4 | 4 | 4 | 4 | 4 |
| Fe2O3 | 2 | 2 | 2 | 2 | 2 |
| MnO2 | — | — | — | — | — |
| CuO | — | — | — | — | — |
| CoO | 2 | 2 | 2 | 2 | 2 |
| CeO2 | 4 | 4 | 4 | 4 | 4 |

| BASE GLASS | SAMPLE NO. | | |
|---|---|---|---|
| | 27 | 28 | 29 |
| SiO2 | 36 | 34 | 36 |
| B2O3 | 24 | 24 | 24 |
| ZnO | 10 | 10 | 10 |
| Na2O | 6.71 | 6.71 | 6.71 |
| K2O | 3.29 | 3.29 | 3.29 |
| CaO | 2 | 4 | — |
| ZrO2 | 6 | 6 | 6 |
| Other | | | BaO 2 |
| F2 | 4 | 4 | 4 |
| U.V. Additive | | | |
| MoO3 | 4 | 4 | 4 |
| Fe2O3 | 2 | 2 | 2 |
| CoO | 2 | 2 | 2 |
| CeO2 | 4 | 4 | 4 |

*AMP is Aluminum Metaphosphate, Al(PO3)3.

TABLE V

| Sample | Firing | % Transmission at 365 mµ | % Transmission at 254 mµ |
|---|---|---|---|
| No pigment | 1200° F. | 38.0 | 4.4 |
| No pigment | 1150° F. | 35.0 | 4.2 |
| With 12½% | 1200° F. | 2.0 | 0.6 |
| V-710 pigment | 1150° F. | 1.5 | 0.7 |
| With 12½% | 1200° F. | 0 | 1.0 |
| F-6340 pigment | 1150° F. | 0 | 1.0 | forth test data for sample 29, all of the samples were found to have substantially improved U.V. absorbing characteristics.

EXAMPLE 6

One kilogram batches of two glass compositions, one for regular fire application and one for fast fire application having the oxide compositions set forth in table VIA were prepared from the batch materials set forth in Table VIB.

The materials in both cases were blended together carefully and melted in a refractory crucible at 1250° C. for 1 hour. The melt was then quenched by passing through water cooled steel rolls with a gap of about 1/32" to produce a glass frit.

EXAMPLE 7

A series of samples were prepared corresponding to the regular fire composition of Table VI A, with separate batches being melted for 45 minutes, 60 minutes, 75 minutes and 90 minutes. Samples from each of these melts were mixed on a 90/10 glass to pigment weight basis with V-710 black pigment. Separate samples of each mix were then fired at 1250° F. for periods of 4, 5 and 6 minutes. The resulting enamel was subjected to long and short wavelength U.V. radiation using a 90/10 mixture of commercial lead glass and V-710 black pigment as a control. The results of these tests are set forth in Table VII.

Where the glass compositions of the present invention are to be employed in compositions such as silk screen ink compositions, they are prepared by conventional means well known to those skilled in the art. Generally, the ink composition will contain from about 59 to about 77% by weight glass frit, from about 8 to about 16% by weight pigment and from about 15 to about 25% by weight vehicle. Typically, the pigment used in the present U.V. applications is a black ceramic pigment such as a V-710 pigment or F-6340 pigment (both manufactured by Ferro Corporation) though any suitable ceramic pigment may be employed. A typical vehicle for use in compositions such as these would be about 77 to about 84% by weight pine oil, about 15 to about 20% by weight acrylic resin, and from about 1 to about 3% surfactant such as a polymerized dialkyl phosphate, and/or a mixture of surfactants of the type commercially available from a number of sources.

Because of the greater U.V. light absorbency of the glass compositions of the present invention and the absence of lead from these compositions two particular advantages are readily apparent. First, the glass composition per se will be considerably lighter than would be the case for a similar lead containing composition which means less weight is used per piece of automobile glass, which would reduce the cost per piece. In addition because of the phenomenal improvement in U.V. light absorption, it will be possible to substantially reduce the amount of pigment required to maintain a particular level of U.V. absorbency. Other advantage will of course be obvious to those skilled in the art with respect to the particular base glass and/or U.V. additive combinations selected.

The novel unpigmented (or very lightly pigmented) glaze compositions of the present invention can also be employed to produce so called "tinted windshields" where a portion of the windshield, usually the top, is tinted typically a bluish color. This tinting has heretofore frequently been accomplished by soaking the composite windshield member (typically two outer layers of glass with a plastic safety layer of polymer such as polyvinyl butyrate in the middle) in a liquid dye bath until sufficient dye is absorbed by the polymeric safety layer to provide the desired degree of tint. Many of the glazes of the present invention have a slightly bluish tinge, and could be much more quickly and expeditiously applied to provide the desired degree of tint without prolonged soaking of the windshield member in a dye vat.

In other uses, such as protective eyewear, the glass compositions of the present invention could provide much more scratch resistant lenses than are now avail-

TABLE VI A

|  | FAST FIRE | REGULAR |
|---|---|---|
| $SiO_2$ | 36 | 28 |
| $B_2O_3$ | 24 | 28 |
| $ZrO_2$ | 6 | — |
| $Al_2O_3$ | — | 3 |
| $Na_2O$ | 6.71 | 5.06 |
| $K_2O$ | 3.29 | 4.94 |
| $Li_2O$ | — | 1.0 |
| ZnO | 10 | 17.5 |
| BaO | 2 | — |
| $MoO_3$ | 4 | 4 |
| $Fe_2O_3$ | 2 | 2.5 |
| CoO | 2 | 1.5 |
| $CeO_2$ | 4 | 4 |
| $MnO_2$ | — | 0.5 |
| $F_2$ | 4 | 6 |
| Tg (°C.) | 454 | 415 |
| DSP (°C.) | 515 | 470 |
| Exp. Coeff. (RT-300° C.) × $10^{-7}$/°C. | 76.4 | 80.0 |

TABLE VI B

| Batch Material | Regular | Fast Fire |
|---|---|---|
| Powdered Quartz | 248.4 grams | 309.0 grams |
| Dehydrated Borax | 163.4 grams | 217.9 grams |
| High Purity Anhydrous Boric Acid | 168.8 grams | 90.6 grams |
| Alumina hydrate | 45.8 grams | 0 grams |
| Potassium Silicofluride | 116.5 grams | 77.7 grams |
| Zinc Oxide | 175.0 grams | 100.0 grams |
| Molybdenum trioxide | 40.0 grams | 40.0 grams |
| Cobalt Oxide | 15.0 grams | 20.0 grams |
| Red Iron Oxide | 25.0 grams | 20.0 grams |
| Cerium Dioxide | 40.0 grams | 40.0 grams |
| Manganese Dioxide | 5.0 grams | 0 grams |
| Lithium Carbonate | 25.1 grams | 0 grams |
| Milled Zircon | 0 grams | 90.0 grams |
| Barium Carbonate | 0 grams | 26.0 grams |

TABLE VII

REGULAR FIRE GLASS*

| Sample | % Transmission at 365 mμ | % Transmission at 254 mμ | |
|---|---|---|---|
| PF-98 (Lead Glass) | 8.1 | 0 | |
| Sample 1 Melted 45 Mins. | 0 | 0 | Fired at 1250° F., 6 mins. |
| Sample 2 Melted 60 mins. | 0 | 0 | |
| Sample 3 Melted 75 mins. | 0 | 0 | |
| Sample 4 Melted 90 mins. | 0 | 0 | |
| PF-98 | 13.5 | 0 | |
| Sample 5 Melted 45 mins. | 0 | 0 | Fired at 1250° F., 5 mins. |
| Sample 6 Melted 60 mins. | 0 | 0 | |
| Sample 7 Melted 75 mins. | 0 | 0 | |
| Sample 8 Melted 90 mins. | 0 | 0 | |
| PF 98 | 13.5 | 0 | |
| Sample 9 Melted 45 mins. | 0 | 0 | Fired at 1250° F., 4 mins. |
| Sample 10 Melted 60 mins. | 0 | 0 | |
| Sample 11 Melted 75 mins. | 0 | 0 | |
| Sample 12 Melted 90 mins. | 0 | 0 | |

*Composition of TABLE VI A able, and could be inexpensively cut from sheets of flat glass. Alternatively, the compositions can be applied as a glaze over regular lens glass which can be ground to prescriptions in the conventional manner either before or after glazing.

While there have been described herein what are at present considered to be the preferred embodiments of this invention, it will be apparent to those skilled in the art that various changes and modifications may be made therein without departing from the invention, and it is therefore, intended in the appended claims to cover all such changes and modifications as fall within the true spirit and scope of the invention.

I claim:

1. An improved U.V. absorbing glass composition comprising from about 75 to about 98 parts by weight of a lead oxide free base glass containing in part by weight based on 100 parts by weight of the base glass form about 19 to about 45 parts $SiO_2O$, from about 20 to about 33 parts $B_2O_3$, from about 8 to about 15 parts alkali metal oxide, from about 0 to about 35 parts zinc oxide, from about 0 to about 10 parts zirconium dioxide, from about 0 to about 6 parts aluminum oxide, from about 0 to about 3 parts barium oxide, from about 0 to about 8 parts $P_2O_5$, from about 0 to about 6 parts $La_2O_3$, and from about 2 to about 10 parts of added fluorine and form about 2 to about 25 parts by weight of a U.V. additive selected from the group consisting of cerium oxide, manganese oxide, iron oxide, cobalt oxide, copper oxide, vanadium oxide, molybdenum oxide, and mixtures of two or more of said oxides.

2. The U.V. absorbing glass composition of claim 1 wherein said glass contains in parts by weight based on 100 parts by weight of base glass from about 25 to about 38 parts $SiO_2$, from about 22 to about 30 parts $B_2O_3$, from about 0 to about 8 parts $ZrO_2$, from about 0 to about 5 parts $Al_2O_3$, from about 9 to about 12 parts alkali metal oxide, from about 8 to about 21 parts ZnO, from about 0 to about 3 parts BaO, from about 2 to about 4 parts $MoO_3$, from about -1 to about 5 parts $Fe_2O_3$, from about 1 to about 4 parts CoO, from about 0 to about 3 parts $TiO_2$, from about 0 to about 4 parts CaO, form about 0 to 5 parts $La_2O_3$ and from about 2 to about 10 parts of added fluorine.

3. The glass composition of claim 1 wherein said glass also contains from about 8% to about 16% by weight of a ceramic pigment.

4. The glass composition of claim 2 wherein said glass also contains from about 8% to about 16% by weight of a ceramic pigment.

5. The glass composition of claim 1 wherein said glass corresponds to the following oxide composition:

| Oxide | Percent by Weight |
| --- | --- |
| $SiO_2$ | 36 |
| $B_2O_3$ | 24 |
| $ZrO_2$ | 6 |
| $Na_2O$ | 6.71 |
| $K_2O$ | 3.29 |
| ZnO | 10 |
| BaO | 2 |
| $MoO_3$ | 4 |
| $Fe_2O_3$ | 2 |
| CoO | 2 |
| $CeO_2$ | 4 |
| $F_2$ | 4 |

6. The glass composition of claim 1 wherein said glass corresponds to the following oxide composition:

| Oxide | Percent by Weight |
| --- | --- |
| $SiO_2$ | 28 |
| $B_2O_3$ | 28 |
| $Al_2O_3$ | 3 |
| $Na_2O$ | 5.06 |
| $K_2O$ | 4.94 |
| $Li_2O$ | 1.0 |
| ZnO | 17.5 |
| $MoO_3$ | 4 |
| $Fe_2O_3$ | 2.5 |
| CoO | 1.5 |
| $CeO_2$ | 4 |
| $MnO_2$ | 0.5 |
| $F_2$ | 6 |

7. The glass composition of claim 5 wherein said glass also contains from about 8% to about 16% by weight of a ceramic pigment.

8. The glass composition of claim 6 wherein said glass also contains from about 8% to about 16% by weight of a ceramic pigment.

9. An ink composition comprising from about 15 to about 25% by weight vehicle, from about 8 to about 16% by weight pigment, and from about 59 to about 77% by weight glass frit, said glass frit comprising from about 75 to about 98 parts by weight of a lead free base glass containing in part by weight based on 100 parts by weight of the base glass from about 19 to about 45 parts $SiO_2$, form about 20 to about 33 parts $B_2O_3$, from about 8 to about 15 parts alkali metal oxide, from about 0 to about 35 parts zinc oxide, from about 0 to about 10 parts zirconium dioxide, from about 0 to about 6 parts aluminum oxide, from about 0 to about 3 parts barium oxide, from about 0 to about 8 parts $P_2O_5$, from about 0 to about 6 parts $La_2O_3$, and from about 2 to about 10 parts of added fluorine, and from about 2 to about 25 parts by weight of a U.V. additive selected from the group consisting of cerium oxide, manganese oxide, iron oxide, cobalt oxide, copper oxide, vanadium oxide, molybdenum oxide, and mixtures of two or more of said oxides.

10. The ink composition of claim 9 wherein said glass contains in parts by weight based on 100 parts by weight of base glass from about 25 to about 38 parts $SiO_2$, from about 22 to about 30 parts $B_2O_3$, from about 0 to about 8 parts $ZrO_2$, from about 0 to about 5 parts $Al_2O_3$, from about 9 to about 12 parts alkali metal oxide, from about 8 to about 21 parts ZnO, from about 0 to about 3 parts BaO, from about 2 to about 4 parts $MoO_3$, from about 1 to about 5 parts $Fe_2O_3$, from about 1 to about 4 parts CoO, from about 0 to about 3 parts $TiO_2$, from about 0 to about 4 parts CaO, from about 0 to about 5 parts $La_2O_3$ and from about 2 to about 10 parts of added fluorine.

11. The ink composition of claim 9 wherein said vehicle comprises based on the weight of said vehicle, from about 77 to about 84% by weight pine oil, from about 15 to about 20% by weight acrylic resin and from about 1 to about 3% by weight surfactant.

12. The ink composition of claim 9 wherein said base glass corresponds to the following oxide composition:

| Oxide | Parts by Weight |
| --- | --- |
| $SiO_2$ | 36 |
| $B_2O_3$ | 24 |
| $ZrO_2$ | 6 |
| $Na_2O$ | 6.71 |
| $K_2O$ | 3.29 |
| ZnO | 10 |

-continued

| Oxide | Parts by Weight |
|---|---|
| BaO | 2 |
| MoO$_3$ | 4 |
| Fe$_2$O$_3$ | 2 |
| CoO | 2 |
| CeO$_2$ | 4 |
| F$_2$ | 4 |

13. The ink composition of claim 11 wherein said base glass corresponds to the following oxide composition:

| Oxide | Parts by Weight |
|---|---|
| SiO$_2$ | 36 |
| B$_2$O$_3$ | 24 |
| ZrO$_2$ | 6 |
| Na$_2$O | 6.71 |
| K$_2$O | 3.29 |
| ZnO | 10 |
| BaO | 2 |
| MoO$_3$ | 4 |
| Fe$_2$O$_3$ | 2 |
| CoO | 2 |
| CeO$_2$ | 4 |
| F$_2$ | 4 |

14. The ink composition of claim 9 wherein said base glass corresponds to the following oxide composition:

| Oxide | Parts by Weight |
|---|---|
| SiO$_2$ | 28 |
| B$_2$O$_3$ | 28 |
| Al$_2$O$_3$ | 3 |
| Na$_2$O | 5.06 |
| K$_2$O | 4.94 |
| Li$_2$O | 1.0 |
| ZnO | 17.5 |
| MoO$_3$ | 4 |
| Fe$_2$O$_3$ | 2.5 |
| CoO | 1.5 |
| CeO$_2$ | 4 |
| MnO$_2$ | 0.5 |
| F$_2$ | 6 |

15. The ink composition of claim 11 wherein said base glass corresponds to the following oxide composition:

| Oxide | Parts by Weight |
|---|---|
| SiO$_2$ | 28 |
| B$_2$O$_3$ | 28 |
| Al$_2$O$_3$ | 3 |
| Na$_2$O | 5.06 |
| K$_2$O | 4.94 |
| Li$_2$O | 1.0 |
| ZnO | 17.5 |
| MoO$_3$ | 4 |
| Fe$_2$O$_3$ | 2.5 |
| CoO | 1.5 |
| CeO$_2$ | 4 |
| MnO$_2$ | 0.5 |
| F$_2$ | 6 |

16. A method of improving the U.V. absorbing properties of a lead oxide free base glass composition, the step which comprises incorporating from about 2 to about 25 parts by weight of a U.V. additive selected from the group consisting of cerium oxide, manganese oxide, iron oxide, cobalt oxide, copper oxide, vanadium oxide, molybdenum oxide, and mixtures of two or more of said oxides, into from about 75 to about 98 parts by weight of said lead oxide free base glass wherein said base glass contains in part by weight based on 100 parts by weight of the base glass from about 19 to about 45 parts SiO$_2$, from about 20 to about 33 parts B$_2$O$_3$, from about 8 to about 15 parts alkali metal oxide, from about 0 to about 35 parts zinc oxide, form about 0 to about 10 parts zirconiium dioxide, from about 0 to about 6 parts aluminum oxide, from about 0 to about 3 parts barium oxide, from about 0 to about 8 parts P$_2$O$_5$, from about 0 to about 6 parts La$_2$O$_3$, and from about 2 to about 10 parts of added fluorine.

17. The method of claim 16 wherein said glass contains in parts by weight based on 100 parts by weight of base glass from about 25 to about 38 parts SiO$_2$, from about 22 to about 30 parts B$_2$O$_3$, from about 0 to about 8 parts ZrO$_2$, from about 0 to about 5 parts Al$_2$O$_3$, from about 9 to about 12 parts alkali metal oxide, from about 8 to about 21 parts Zno, from about 0 to about 3 parts BaO, form about 2 to about 4 parts MoO$_3$, from about 1 to about 5 parts Fe$_2$O$_3$, from about 1 to about 4 parts CoO, from about 0 to about 3 parts TiO$_2$, from about 0 to about 4 parts CaO, from about 0 to about 5 parts La$_2$O$_3$ and from about 2 to about 10 parts of added fluorine.

* * * * *